May 2, 1967 — S. M. KORDIAK — 3,316,595
MOLD FOR PRODUCING FOAM RUBBER CUSHIONING
Filed Dec. 20, 1963 — 3 Sheets-Sheet 1

INVENTOR.
STEPHEN M. KORDIAK
BY
James P. Lindsay
ATTY.

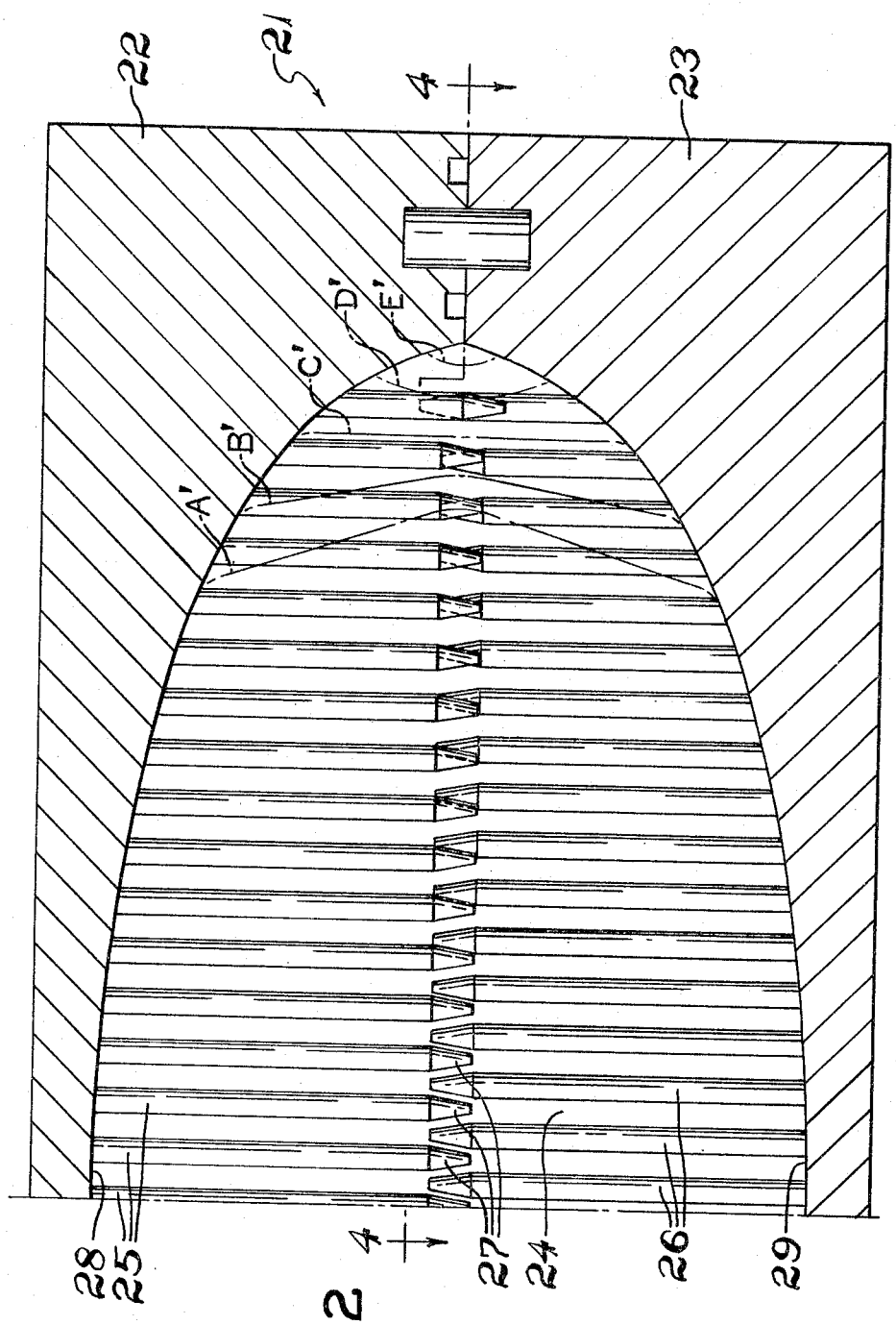

May 2, 1967  S. M. KORDIAK  3,316,595
MOLD FOR PRODUCING FOAM RUBBER CUSHIONING
Filed Dec. 20, 1963  3 Sheets-Sheet 3

INVENTOR.
STEPHEN M. KORDIAK
BY
James R. Lindsay
ATTY.

United States Patent Office 3,316,595
Patented May 2, 1967

3,316,595
MOLD FOR PRODUCING FOAM RUBBER CUSHIONING
Stephen M. Kordiak, Orange, Conn., assignor to The B. F. Goodrich Company, New York, N.Y., a corporation of New York
Filed Dec. 20, 1963, Ser. No. 331,995
3 Claims. (Cl. 18—39)

This invention relates to a mold for producing foam rubber cushioning.

A major proportion of the foam rubber cushioning manufactured today is produced in a closed mold, the cushioning being molded either into the final shape in which it will be used (for example, in the shape of a pillow or mattress) or into an oversized molded slab from which desired shapes (for example, seat cushions) can be cut. In the manufacture of such cushioning, the quantity of latex composition required to produce a molded latex foam rubber product of a desired density first is introduced into the mold cavity and the mold is closed. The filling of the mold cavity with frothed latex composition can be accomplished in various ways. One method involves the expansion within the mold cavity of a measured quantity of latex composition using an unstable peroxide solution which is added to the latex composition just prior to introducing the latex composition into the mold cavity and closing the mold. The decomposition of the unstable peroxide solution releases minute bubbles of oxygen within the latex composition which transforms the latex composition into a cellular structure that fills the cavity of the mold. Another procedure which is used (and perhaps the one most frequently employed) involves whipping air into the latex composition to produce a froth of must finer cell size than desired in the cellular structure of the molded product. A measured quantity of this fine-celled froth is introduced into the mold cavity and the mold is closed, the quantity of latex foam added to the mold cavity being sufficient only to partially fill the mold cavity. Thereafter, air is withdrawn from the mold cavity producing a reduced pressure within the unfilled portion of the cavity which causes the latex foam to expand. The withdrawal of air from the mold cavity is continued until the latex froth fills the mold cavity. In both procedures described, there exists the danger that air will be trapped within the mold cavity between the wall of the mold cavity and the frothed latex composition as the latex composition expands. The danger of entrapping a pocket of air within the mold cavity is especially serious when the mold cavity is domed. It will be appreciated that the entrapped air will cause an objectionable void to be formed at the surface of the molded foam rubber product.

Entrapment of air pockets in the mold cavity usually results from the unintentional premature sealing of the normal paths along which the air escapes from the mold cavity as the latex composition expands. Foam rubber molds customarily are made in two mating parts. Unless a special port is provided in the wall of the mold for allowing air to escape from the mold cavity as the latex composition expands within the mold cavity the air within the mold cavity must escape through the space between the mating faces of the two halves of the mold. Consequently, the juncture of the abutting faces of the mold halves deliberately is not made airtight.

As the latex composition expands in the mold cavity, the latex composition expands upwardly and outwardly until the expanding latex composition reaches the roof of the mold cavity after which the composition expands toward the sides only. However, the expanding latex composition tends to expand toward the sides of the mold cavity faster along the median horizontal zone of the mold cavity than along the roof and floor of the mold cavity. As a consequence, it often occurs that the expanding bank of latex composition reaches the juncture between the two mold halves through which the air in the mold cavity is intended to escape before all of the air within the mold cavity has been expelled and prevents the further escape of air from the cavity. When this condition occurs, one can expect that the molded product will have the voided areas mentioned above.

The present invention overcomes the difficulty of air entrapment discussed above. In accordance with this invention, the mold is provided with coring pins around the peripheral zone of the mold cavity that function to restrict the flow of the expanding latex composition in the median horizontal zone of the mold cavity as it approaches the sides of the mold to allow the expanding latex composition adjacent the roof of the mold cavity and that adjacent the floor of the mold cavity to advance toward the sides of the mold cavity at a faster rate than the latex composition in the median horizontal zone of mold cavity.

The invention will be more fully understood by referring to the following description that illustrates a specific embodiment of the invention and to the drawings in which:

FIG. 2 is a fragmentary elevation view in section of a mold for molding a latex foam rubber pillow that embodies the present invention;

Figure 1:
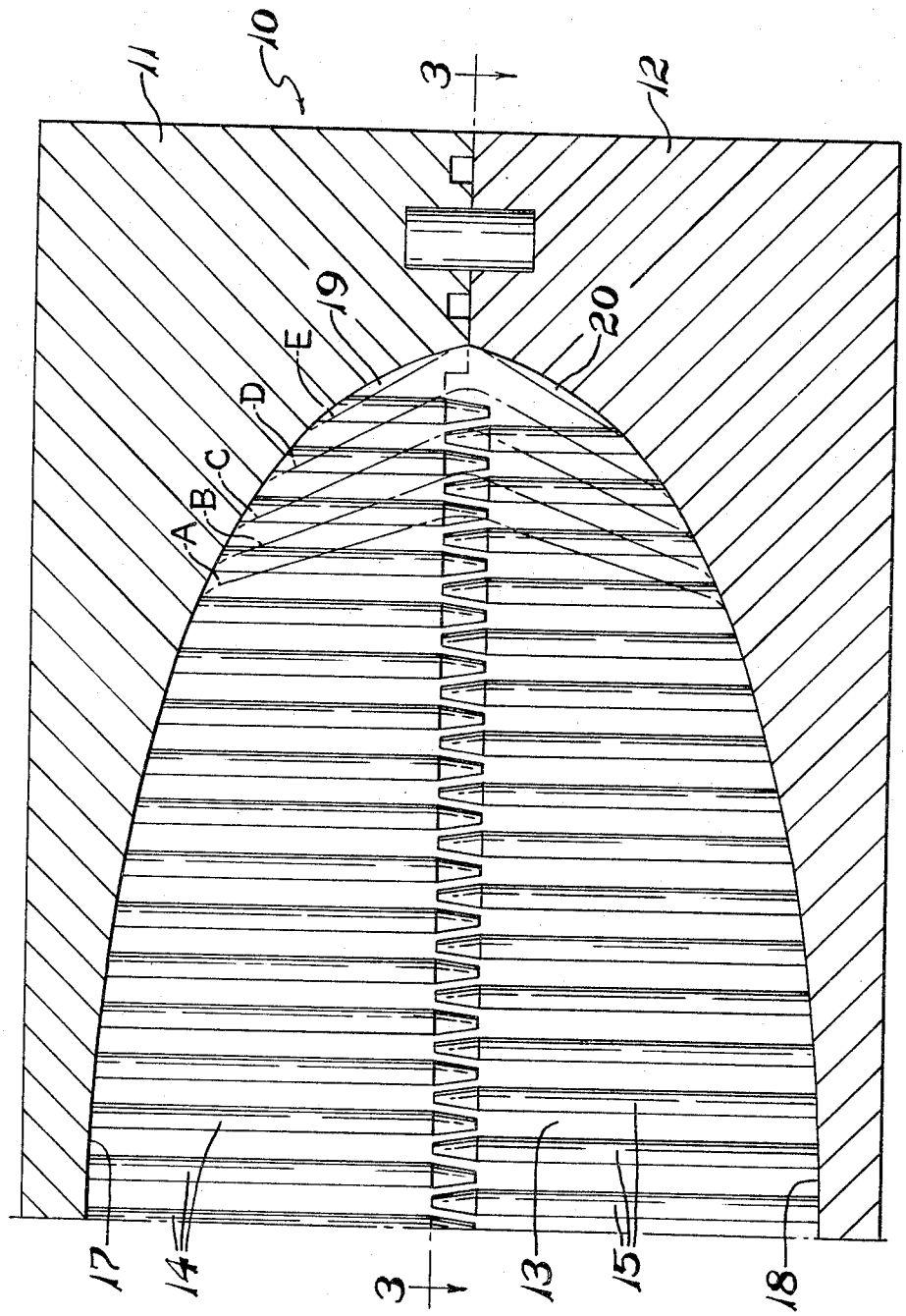
FIG. 1 is a fragmentary elevation view in section of a mold for molding a latex foam rubber pillow and showing a conventional core pin arrangement.
Figure 3:
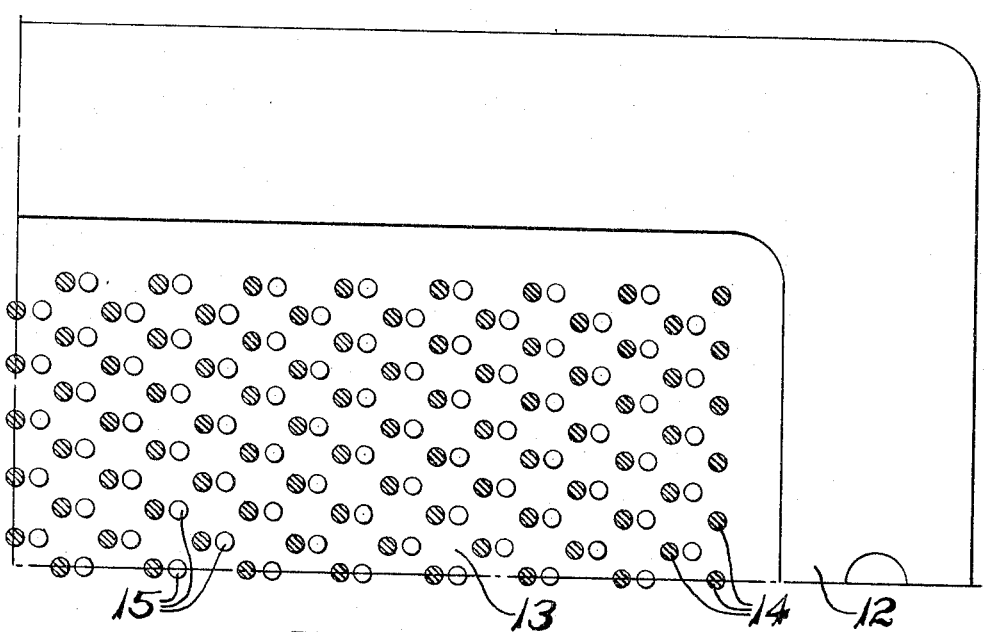
FIG. 3 is a fragmentary section on the line 3—3 of FIG. 1.

Referring to the drawings, FIG. 1 depicts a mold 10 that embodies a conventional construction. As is apparent from the drawings, mold 10 comprises a pair of separable mold sections, specifically, an upper mold section 11 which often is referred to as the "lid section" of the mold and a bottom mold section 12 that at times has been called the "dish section" of the mold. When mold 10 is closed with the lid section 11 positioned on top of the dish section 12 the mold halves 11 and 12 define a mold cavity 13 within which the product is shaped. The walls of mold sections 11 and 12 may be of a hollow construction (not shown) to allow a cooling or heating fluid to be circulated within the walls of the mold to facilitate cooling and/or heating of the mold. As is customary when molding a latex foam rubber product 2½ to 3 inches or more in thickness, the upper section 11 of the mold 10 is provided with core pins 14, 14 that project interiorly into the mold cavity 13. In like manner the bottom section 12 of the mold 10 is provided with core pins 15, 15 that project interiorly into the mold cavity 13 but are spaced from core pins 14, 14. The core pins 14, 14, 15, 15 cause the formation of cavities or corings in the molded foam rubber product. Coring is beneficial in that the corings or cavities in the foam rubber permit a reduction in the weight of the foam rubber structure with an attendant savings in material as compared to an uncored structure of equal compression resistance. Also, the core pins increase the mold surface in contact with the foamed latex in the mold cavity thereby increasing the rate of heat-transfer between the foamed latex and the mold facilitating freezing the latex foam if the process described in U.S. Patent 2,432,353 is used for coagulating the latex and facilitating heating the congealed latex foam to vulcanize it. In the mold construction shown in FIG. 1, core pins 14, 14 extend into the mold cavity 13 slightly more than half-way and terminate along a common horizontal plane and coring pins 15, 15 also extend into the mold cavity 13 slightly more than half-way and terminate along a common horizontal plane. Since both core pins 14, 14 and core pins 15, 15 extend more than half-way into the mold cavity and since the core pins 14, 14 are to be spaced from core pins 15, 15 it will be apparent that the distal ends of core pins 14, 14 will have to project between core pins 15, 15. Of course, if core pins 14, 14, 15, 15 do not extend at least half-way into the mold cavity 13, then pins 14, 14 if desired can be directly opposed to core pins 15, 15. As is illustrated in FIG. 3, the pattern formed by core pins 14, 14 and the pattern formed by core pins 15, 15 are regular patterns with the core pins 14, 14 being equally spaced from immediately adjacent core pins 14, 14 and with core pins 15, 15 being equally spaced from immediately adjacent core pins 15, 15.

The mold sections 11 and 12 usually are pivotally hinged together, although molds in which the lid section 11 is moved vertically to and from the dish section 12 have been used. The mold also normally has a sealing element positioned between the mating faces of the mold halves 11 and 12 to prevent loss of latex compound through the juncture between the tow mold sections. A fibrous gasket that fits into a channel formed by a pair of directly opposed grooves, one situated in the mating face of one mold section and the other situated in the mating face of the other mold section, and extending around the entire mold cavity has proven highly successful as a sealing element. The fibrous gasket is air pervious and allows air being expelled from the mold cavity to pass freely therethrough but does not allow the latex composition to pass therethrough. Such a sealing element is described in U.S. Patent 2,731,669. It will be understood that since the specific manner used for preventing objectionable loss of latex composition from between the mating faces of the mold halves, the construction of the mold walls per se (whether they be of solid construction or hollow) and the manner of assembling the mold sections with relation to each other (i.e. whether the mold sections are hinged together, etc.) form no part of the present invention and since various ways for accomplishing these results are well known, these details of the mold construction are not shown in the drawings or described in detail.

As was explained above, when the latex composition expands within the mold cavity, the latex composition expands upwardly and sideways until the expanding foam reaches the upper surface or roof 17 of the mold cavity 13 after which the expanding latex composition continues to expand sideways toward the sides of the mold cavity 13. In the conventional mold construction shown in FIG. 1, as the expanding foam expands out toward the sides of the mold cavity 13 the expanding latex foam advances along the median horizontal zone of the mold cavity 13 at a faster rate than it does along the roof 17 of the cavity 13 and along the bottom surface or floor 18 of the cavity 13. The manner in which the foam bank advances as it approaches the sides of the mold cavity is illustrated by the lines A, B, C, D and E of FIG. 1 which represent the line of advance of the expanding latex composition at different times during its advance. As can be seen, when the expanding foam bank has reached the line of advance outlined by line A, the expanding latex foam is furthest advanced along the median horizontal zone of the cavity while the latex composition adjacent the roof 17 and floor 18 of the cavity 13 lags somewhat behind. When a short time later the bank of expanding foam has reached the line of advance outlined by line B, the foam in the median horizontal zone of the cavity has advanced even further in front of the foam adjacent the roof 17 and floor 18 of the cavity 13. The same situation prevails as the bank of expanding latex foam continues to advance toward the sides of the mold cavity 13 (as illustrated by lines C and D which outline the line of advance of the expanding latex foam at two subsequent times) even until the expanding latex foam contacts the sides of the mold cavity 13. At the time the expanding latex foam first contacts the sides of the mold cavity 13 the expanding latex foam in the median horizontal zone is considerably ahead of the foam advancing along the roof 17 and floor 18 of the cavity 13 which line of advance of the foam bank at this time is represented by the line E. Since the junction between the mating faces of mold sections 11 and 12 and through which the air within the cavity 13 is intended to be expelled is located in the median horizontal zone of the mold, the advancing expanding foam reaches the junction before the air confined within spaces 19 and 20 is expelled through the juncture and if the advancing latex foam seals the junction before the air in spaces 19 and 20 has an opportunity to escape the air will be entrapped and will cause voids to be formed in the surface of the finished product.

Figure 4:
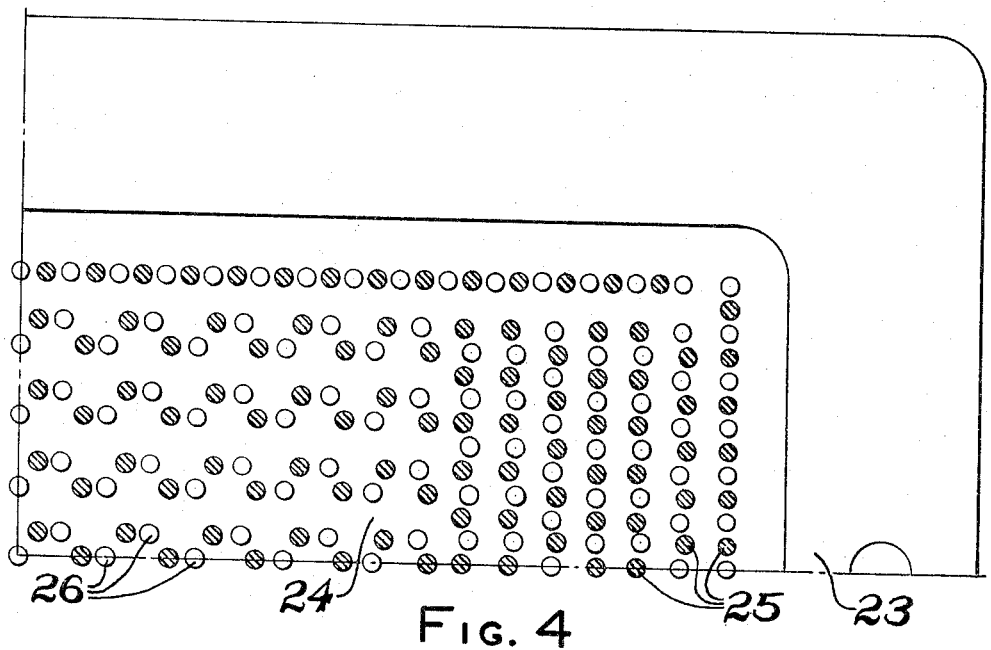
FIG. 4 is a fragmentary section on the line 4—4 of FIG. 2.

The embodiment of the present invention shown in FIGS. 2 and 4 eliminates the difficulty hereinabove discussed by slowing the advance of the expanding latex composition in the median horizontal zone as the foam enters the peripheral margins of the cavity to allow the expanding foam adjacent the roof and that adjacent the floor of the mold cavity to proceed at a faster rate than that of the latex foam in the median horizontal zone. The mold 21 shown in FIG. 2 is similar in most respects to the mold shown in FIG. 1 and includes an upper mold section 22 and a bottom mold section 23 which mold halves when the mold is closed forms mold cavity 24 in which the foam rubber product is shaped. As is shown, the upper mold section 22 is provided with core pins 25, 25 that project interiorly into the mold cavity 24 and the bottom section 23 is provided with core pins 26, 26 that also project into the mold cavity 24 but are spaced from core pins 25, 25. In the embodiment shown, core pins 25, 25 extend more than half-way through the mold cavity 24 as do core pins 26, 26 so that it is necessary that the distal ends 27, 27 of core pins 25, 25 extend between core pins 26, 26. It will be noticed, however, that core pins 25, 25 do not all terminate in a common horizontal plane as do core pins 14, 14 of the upper section 11 of mold 10 and that core pins 26, 26 likewise do not all terminate in a common horizontal plane as do core pins 15, 15 of the bottom section 12 of mold 10 but, instead, the core pins 25', 25' positioned around the periphery of mold cavity 24 and the core pins 26', 26' also positioned around the periphery of mold cavity 24 extend a further distance past the median horizontal plane of the mold cavity 24 than do the other core pins of the mold. When the mold 21 is closed, it will be realized that the distance of penetration of the core pins 25', 25' between core pins 26', 26' is greater than the distance of penetration of core pins 25, 25 between core pins 26, 26. This greater penetration of core pins 25', 25' between core pins 26', 26' in effect reduces the unobstructed cavity volume in this median region of the cavity 24 by interposing a greater volume of obstacle in the path of the expanding latex foam that impedes the flow of the expanding latex foam. Stated in a different way, the rate at which the expanding latex foam advances at a particular section of the cavity is dependent to a large extent on the volume of coring interposed in its path, the greater the volume of the coring in the path of the advancing latex foam the less is the rate at which the expanding latex foam advances. Therefore, in accordance with this finding the rate of advance of the expanding latex foam is slowed in the median horizontal zone of the cavity 24 as the foam enters into the side extremities of the mold cavity 24 by interposing an additional volume of coring in the median horizontal zone of the mold cavity in this area, accomplished by increasing the distance that core pins 25', 25' interject between core pins 26', 26. To obtain the maximum effect it is proposed that core pins 25', 25' and core pins 26', 26' all be in alignment as shown in FIG. 4. While only the outermost row of core pins in each mold section are shown to project the greater distance between the opposing core pins of the other mold section, it will be appreciated that two or even more of the peripheral rows of pins may be so constructed, particularly when small diameter pins are involved. Also, while the rows of core pins 25, 25 and rows of core pins 26, 26 may be staggered with respect to each other in the central portion of the cavity, preferably the rows of core pins 25, 25 come more and more in alignment with the rows of core pins 26, 26 as the rows of core pins approach the side extremities of the mold cavity 24.

The effect of bringing the rows of core pins 25, 25 and rows of core pins 26, 26 more in alignment as the rows of core pins approach the side extremities of the mold cavity 24 and the effect of the greater interjection of core pins 25', 25' between core pins 26', 26' as compared to the interjection of core pins 25, 25 between core pins 26, 26 is illustrated by the lines A', B', C', D' and E' of FIG. 2 which represent the line of advance of the bank of expanding latex composition at different times during its advance. As is illustrated in FIG. 2, when the bank of expanding foam has reached the line of advance defined by line A', the latex composition is further advanced in the median horizontal zone than is the expanding latex that is adjacent the roof 28 of cavity 24 and the expanding latex that is adjacent the floor 29 of cavity 24. However, it is noticed that a short time later when the latex foam has reached the line of advance represented by line B' the expanding foam still is further advanced in the median horizontal zone than the expanding foam that is adjacent the roof 28 of the cavity 24 and adjacent the floor 29 of the cavity 24 but not nearly so pronounced as represented by line A'. The retardation of the expanding latex foam in the median horizontal zone beginning to be noticed is due in part because of the effect of the rows of core pins 25, 25 and rows of core pins 26, 26 being more in alignment with each other but mostly is due to the effect of the greater degree of penetration of core pins 25', 25' between core pins 26', 26' which influences the expanding foam even before it reaches these pins. The effect is even more pronounced when the expanding latex has reached the line of advance illustrated by the line C'. As is seen, at this point the expanding foam in the median horizontal zone and in those areas adjacent the roof 28 and floor 29, respectively, of cavity 24 is advancing at about the same rate. However, when the expanding foam passes the peripheral row of core pins composed of core pins 25', 25' and core pins 26', 26', the retardation effect of the greater interjection of core pins 25', 25' between core pins 26', 26' as compared to that of core pins 25, 25 between core pins 26, 26 is so great that the expanding foam adjacent the roof 28 of cavity 24 and adjacent the floor 29 of cavity 24 has advanced ahead of the expanding foam in the median horizontal zone. This point of advance of the bank of expanding foam is illustrated by line D'. The expanding latex continues to advance in this manner as illustrated by the line E', until the mold cavity is completely filled. It will be appreciated that when the expanding foam adjacent the roof 28 of the cavity 24 and adjacent the floor 29 of the cavity 24 precedes the foam expanding in the median horizontal zone air will be swept ahead of the expanding foam toward the junction between the mating faces of the mold 21 and will be able to escape from the mold cavity 24 before expanding foam reaches the juncture and seals it against the further escape of air from the cavity.

The additional volume of coring required in the median horizontal zone of the peripheral side extremities of the mold cavity to cause the expanding foam adjacent the floor and roof of the mold cavity to advance ahead of the foam in the median horizontal zone will vary, of course, depending upon the fluidity of the expanding foam, the reduced pressure in the unfilled portion of the mold cavity resulting from the withdrawal of air from the mold cavity, the latex composition itself, the coring found in the other areas of the mold cavity, etc. It has been found that increasing the interjection of the core pins 25', 25' between core pins 26', 26' by between 50 to 150 percent when core pins between about ⅛ to ¼ inch in diameter and spaced about ½ inch apart are used is sufficient in most instances.

I claim:

1. A mold for producing foam rubber cushioning which mold comprises a pair of separable mold sections arranged for disposition one on top of the other when said mold is closed, said mold sections when said mold is closed defining a mold cavity for shaping said cushioning, each said mold section having affixed thereto a plurality of coring pins which project into said mold cavity and terminate short of the inner face of the mold section opposing said pins, the coring pins in the peripheral zone of the mold cavity that project into the mold cavity from one of said mold sections being interjected between the coring pins projecting into the mold cavity from the other said mold section a greater amount than the interjection of opposing coring pins projecting into the central zone of the mold cavity whereby a greater volume of coring is present in the median horizontal zone of the mold cavity at the peripheral zone of the mold cavity than in the central portion of the mold cavity which causes the rate of advance of expanding latex composition in the said mold cavity to be less in the median horizontal zone in the peripheral zone of the mold cavity than the rate of advance of expanding latex composition adjacent the roof surface and floor surface of the mold cavity.

2. A mold for producing foam rubber cushioning which mold comprises a pair of separable mold sections arranged for disposition one on top of the other when said mold is closed, each said mold section having affixed thereto a plurality of coring pins which project into said mold cavity and terminate short of the inner face of the mold section opposing said pins, the coring pins in the peripheral zone of the mold cavity that project into the mold cavity from one of the said mold sections being interjected between the coring pins projecting into the mold cavity from the other said mold section and being in alignment therewith around the peripheral zone of the mold cavity, the injection of said coring pins of the one said mold section between the coring pins of the other said mold section in the peripheral zone of the mold cavity being greater than the interjection of opposing coring pins projecting into the central portion of the mold cavity whereby a greater volume of coring is present in the median horizontal zone of the mold cavity at the peripheral zone of the mold cavity than in the central portion of the mold cavity which causes the rate of advance of the expanding latex composition in the said mold cavity to be less in the median horizontal zone in the peripheral zone of the mold cavity than the rate of advance of expanding latex composition adjacent the roof surface and floor surface of the mold cavity.

3. A mold for producing foam rubber cushioning which mold comprises a pair of separable mold sections arranged for disposition one on top of the other when said mold is closed, each said mold section having affixed thereto a plurality of coring pins which project into said mold cavity and terminate short of the inner face of the mold section opposing said pins, the coring pins in the peripheral zone of the mold cavity that project into the mold cavity from one of the said mold sections being interjected between the coring pins projecting into the mold cavity from the other said mold section and being in alignment therewith around the peripheral zone of the mold cavity, the interjection of said coring pins of the one said mold section between the coring pins of the other said mold section in the peripheral zone of the mold cavity being greater than the interjection of opposing coring pins projecting into the central portion of the mold cavity whereby a greater volume of coring is present in the median horizontal zone of the mold cavity at the peripheral zone of the mold cavity than in the central portion of the mold cavity which causes the rate of advance of the expanding latex composition in the said mold cavity to be less in the median horizontal zone in the peripheral zone of the mold cavity than the rate of advance of expanding latex composition adjacent the roof surface and floor surface of the mold cavity, the coring pins projecting into the central portion of the mold cavity from the said mold sections being in spaced rows which are staggered with respect to the rows of opposing coring pins whereby the rows of coring pins of one mold section interject between the rows of coring pins of the other mold section in the central portion of the mold cavity, the rows of coring pins in one of the mold sections progressively approaching alignment with opposing rows of coring pins in the other mold section as the rows of coring pins approach a side of the mold cavity to additionally retard the rate of flow of the expanding latex foam in the median horizontal zone of the mold cavity as the expanding latex foam approaches that side of the mold cavity.

References Cited by the Examiner

UNITED STATES PATENTS

| | | | |
|---|---|---|---|
| 2,364,036 | 11/1944 | MacKay et al. | 264—299 |
| 2,406,589 | 8/1946 | Cunningham | 18—39 |
| 2,821,082 | 1/1958 | Black | 264—299 X |

FOREIGN PATENTS 666,885  7/1963  Canada.

WILLIAM J. STEPHENSON, *Primary Examiner.*

J. HOWARD FLINT, Jr., *Examiner.*